Figure 1:
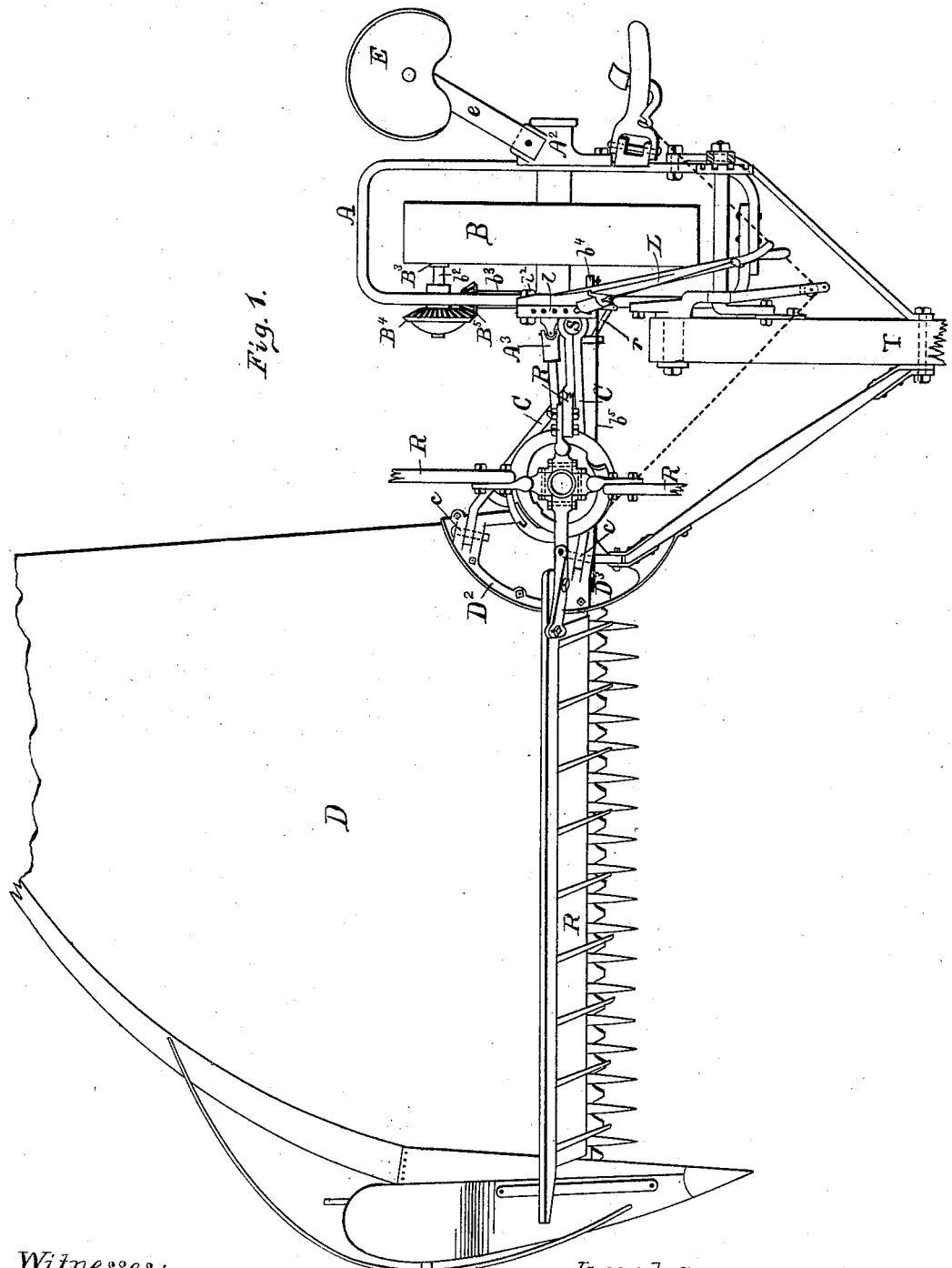

(No Model.) 4 Sheets—Sheet 1.

W. N. WHITELEY.
HARVESTING MACHINE.

No. 351,891. Patented Nov. 2, 1886.

Witnesses:
Oscar E. Perrigo
F. B. Furniss

Inventor:
William N. Whiteley (No Model.)

W. N. WHITELEY.
HARVESTING MACHINE.

No. 351,891. Patented Nov. 2, 1886.

4 Sheets—Sheet 4.

Fig. 4.

Witnesses:
Oscar E. Perrigo
F. B. Furniss

Inventor:
William N. Whitely

UNITED STATES PATENT OFFICE.

WILLIAM N. WHITELEY, OF SPRINGFIELD, OHIO.

HARVESTING-MACHINE.

SPECIFICATION forming part of Letters Patent No. 351,891, dated November 2, 1886.

Application filed November 23, 1885. Serial No. 183,683. (No model.)

*To all whom it may concern:*

Be it known that I, WILLIAM N. WHITELEY, a citizen of the United States, residing in the city of Springfield, in the State of Ohio, have invented certain new and useful Improvements in Harvesting-Machines; and I hereby declare the following to be a full, clear, and exact description of the same, reference being had to the accompanying drawings, forming a part of this specification.

My invention relates to that class of harvesters known as "self-raking reapers and mowers," in which the platform and cutting apparatus may be folded to a vertical position for convenient transportation.

The object of my invention is to construct a self-raking reaper having the cutting apparatus (i. e., the finger-bar, platform, &c.) capable of being easily folded up to a vertical position for transportation or for passing through confined passages, as gateways, &c., securely retained in that position, or quickly returned to its horizontal position, and made as rigid as those which are not constructed with a joint.

My improvement consists of the main frame and the main driving-wheel, which is fixedly journaled thereon, and has the gearing which drives the knife and the rake properly attached thereto, and a supplemental frame supporting the raking and reeling mechanism, and having a vertical adjustment independent of the main frame, and forming the connection between it and the platform and cutting apparatus, to which it is jointed, and a platform and cutting apparatus with the necessary appendages for supporting the outer end of the platform, jointed to the supplemental frame in such a manner that it may be folded for transportation or quickly returned to its horizontal position, and made as rigid as though it was not constructed with a joint. Each of these three members is independent of the others, and at the same time works in unison with the others to perform the several functions of supporting the gearing, main wheel, &c., upon one member, supporting in the proper position the raking and reeling mechanism upon another member, and supporting the cutting and dividing apparatus and grain end of the machine upon a carrying-wheel attached to another member, upon which the grain is collected as it is cut, and from which it is raked at proper intervals to the ground at the side of the machine.

That others may more fully understand my improvements I will more particularly describe them, referring to the drawings forming a part of this specification, and which show all the features of a harvester needed to fully illustrate my improvements and their application.

Figure 2:
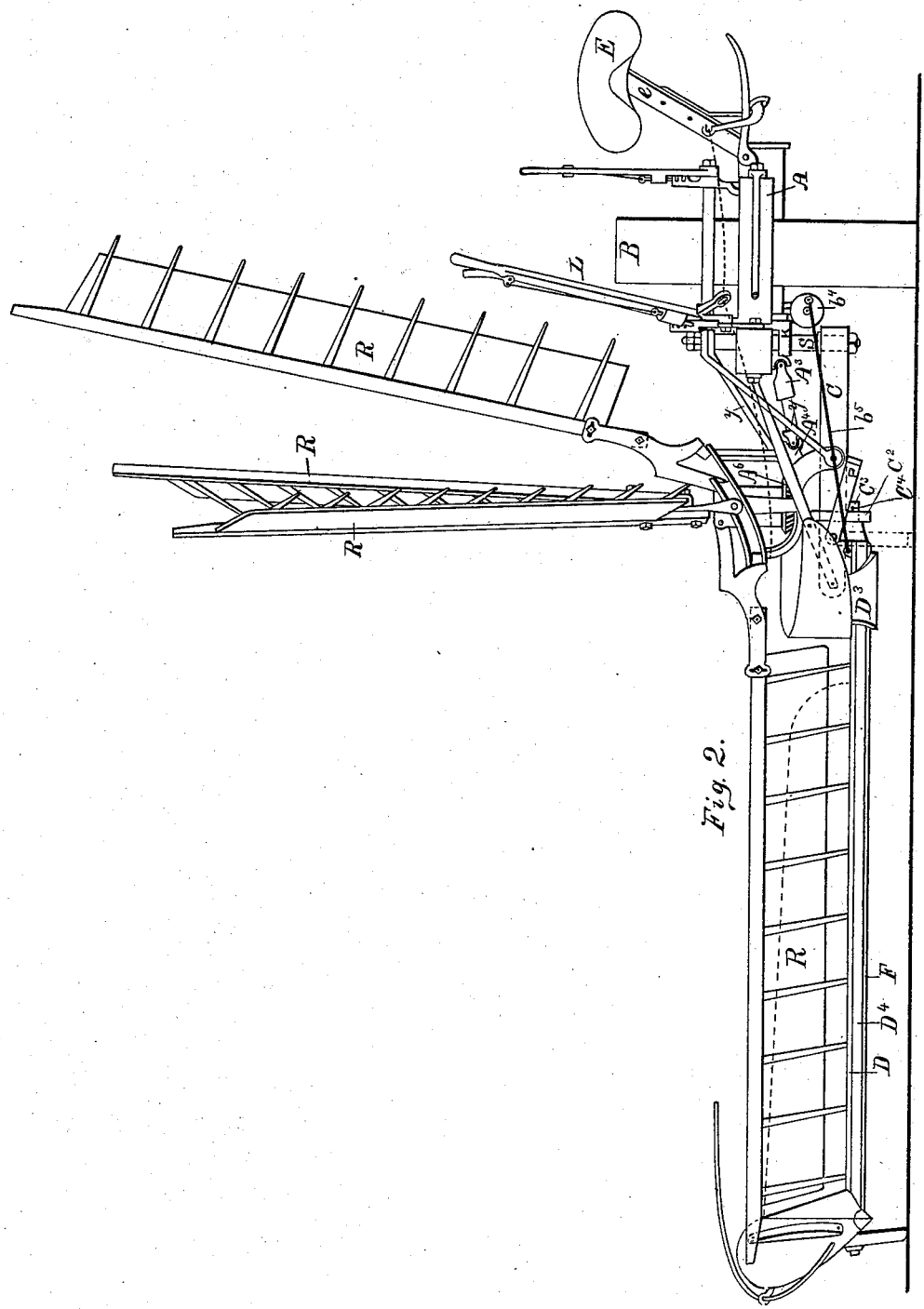
Figure 3:
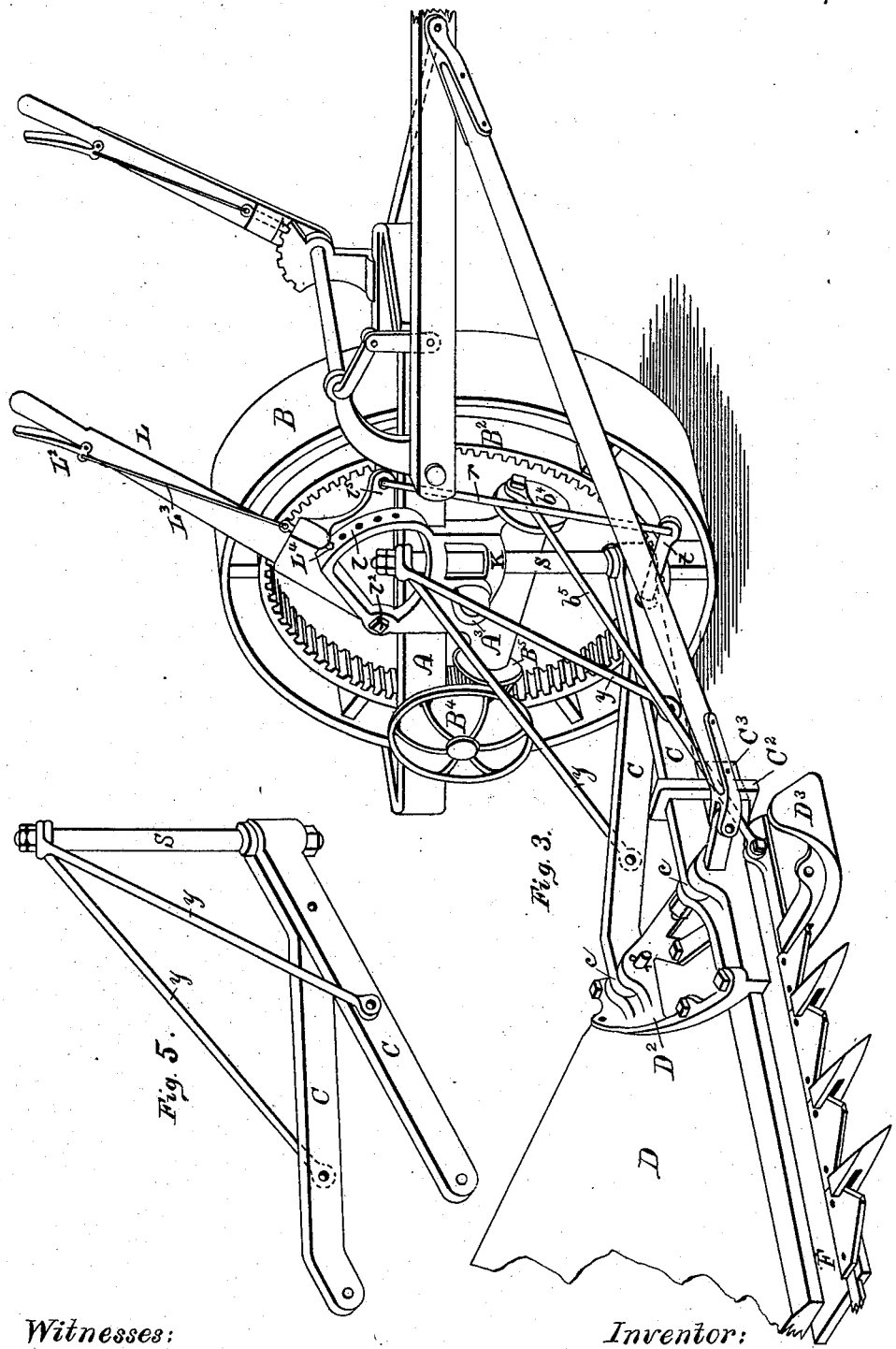

Figure 1 is a plan view of my machine. Fig. 2 is a front elevation showing the machine in position for cutting. Fig. 3 is a perspective view showing the main frame, supplemental frame, and manner of attaching the finger-bar and platform, and the levers and their connections for raising, lowering, and tilting the same. Fig. 4 is a front elevation of my machine, showing the platform folded for transportation. Fig. 5 is a perspective view of the supplemental frame.

In these views some of the parts not necessary to illustrate the features for the illustration of which the view has been made are omitted to avoid confusion.

Similar letters refer to like parts throughout all the views.

The main frame A is constructed of a single flat bar of wrought iron or steel, preferably the latter, bent into a rectangular form, with the two ends lapped and riveted together.

To the main frame A are secured the boxes for the shaft of the main wheel B. Upon the outer box, $A^2$, is cast a bracket, to which is secured the seat-spring $e$, supporting the driver's seat E.

Upon the main wheel B is formed the internal gear, $B^2$, driving the cutting apparatus through the medium of the gears $B^3$ $B^4$ $B^5$ and shafts $b^2$ $b^3$, crank-wheel $b^4$, and pitman $b^5$, all of the usual construction. Upon the inner end of the main shaft is a universal joint, $A^3$, from which extends a shaft to a second universal joint, $A^4$, attached to the bevel-pinion $A^5$, which then engages the bevel-wheel $A^6$, which drives the rakes R. The shaft extending between the universal joints $A^3$ and $A^4$ is made of the telescope form, one portion sliding within the other to compensate for the varying height of the raking mechanism when the cutting apparatus is raised or lowered. The parts of the gearing for operating the cutting apparatus and that for driving the rakes are in themselves not new, and are therefore not more particularly described.

Upon the inner side of the main frame A is bolted the bracket K, having cast upon it two vertically-perforated lugs, through which passes the vertical rod S, to the bottom of which is fixed the Y-shaped bar C C, which is suspended and braced by the brace-rods $yy$. The Y-shaped bar C C, vertical rod S, and braces $yy$ form the supplemental frame by which the platform is attached to the main frame.

The supplemental frame is shown in perspective in Fig. 5 as I prefer to construct it— i. e., of a single flat bar of steel bent into a Y shape, in the bend of which the socket is formed for the vertical rod S, from the top of which one or more braces, $yy$, run to the two branches of the Y-shaped bar C C. However, I do not confine myself to this construction. It may be made of a less or greater number of parts. It may be made wholly or partially of cast metal. It may have three branches to the main bar C C, instead of two. It may have two vertical rods, S, or the rod may be replaced by a plate or frame sliding vertically in grooves, or in a variety of ways. The construction of my supplemental frame may be varied without being essentially different from that illustrated and described; but so long as it embodies the three essential features—viz., first, being connected with the main frame, but having a vertical adjustment independent of it; second, supporting and carrying the raking and reeling mechanism; and, third, having the platform with the cutting apparatus hinged or jointed to it—it is practically and substantially my newly-invented supplemental frame described.

Upon top of the platform D is the hinge-plate $D^2$, bolted through the platform to the inner shoe, $D^3$. On the hinge-plate $D^2$ are formed suitable ears, in which the arms of the Y-shaped bar C C are pivoted at $c\,c$. Upon the hinge-plate $D^2$ is formed the projecting lug $C^3$, which projects from the pivot $c\,c$ under the front portion of the Y-bar C, to which it is clamped by the rectangular sliding clevis or yoke $C^2$, which is held in place by the pin $C^4$, by which means the flexible joint $c\,c$ is rendered rigid when the machine is in position for cutting grain, and at the same time very easily freed when it is desired to fold the platform up for transportation.

Upon the bracket K is formed the pivot $l^2$ of the lifting-lever L, enlarged views of which are shown in Fig. 12. Upon the lever L is formed the perforated projection $l^3$, into which the lifting-rod $r$ is inserted, the lower end being hooked into the stud $t$, fixed in the Y-shaped bar C C near the vertical rod S. The lifting-lever L is provided with the usual hand-piece, $L^2$, from which the rod $L^3$ runs to the catch-pin $L^4$, engaging the holes of the segment $l$. By this mechanism the inner end of the platform, finger-bar, &c., is raised or lowered, as may be desired, or fixed in any required position.

The construction and arrangement of the platform and its connections are peculiar, and are as follows:

To the under side of the front sill, $D^1$, of the platform D is bolted the finger-bar F, which is also bolted to the inner shoe, $D^2$, and outer shoe. The inner shoe, $D^3$, extends a considerable space under the inner corner of the platform D, and upon the top directly over it, and covering a like space, is the hinge-plate $D^2$, which has a downwardly-projecting ledge covering the inner edge of the platform, while upon its top are formed proper lugs or ears for the reception of the ends of the Y-bar C C, in which they are pivoted. The hinge-plate $D^2$, the platform, and the inner shoe, $D^3$, are firmly secured together by several bolts passing through them.

When it is desired to fold up the platform for the purpose of rendering the machine more compact and portable in passing through gateways or going upon the road, the leg P is turned on its pivot so as to rest on the ground. The yoke $C^2$ is caused to slide off the lug $C^3$, so as to liberate the joint on the pin $c$. The grain-wheel is then removed from its slide and placed in a suitable bracket at the inner end of the finger-bar. The cutting apparatus may then be folded, as shown in Fig. 4, and locked in position by the rod $v$. The draft-tongue T is pivoted to the frame, and the usual means are provided for tilting the platform to catch lodged grain.

There are several new and important features shown in the drawings which I do not claim in this application, reserving the right to make claim to the same in a separate application for Letters Patent thereon, executed and filed herewith and indicated by the Serial No. 183,684.

Having thus fully described my invention, what I claim as new, and desire to secure by Letters Patent therefor, is—

A harvesting-machine constructed with a main frame having the main driving-wheel fixedly journaled thereon, and supporting the gearing which operates the knife and rake properly attached thereto, in combination with an intermediate supplemental frame attached to the main frame, but having a vertical adjustment independent of said main frame, and supporting and carrying the raking and reeling mechanisms, and to which the platform and cutting apparatus is flexibly connected, and the platform carrying the cutting apparatus and divider, being supported at the outer end by a carrying-wheel, while its inner end is hinged or jointed to the supplemental frame in such a manner that the platform and cutting apparatus may be folded to a vertical position for transportation, or returned to its horizontal position for cutting, and the said joint rendered rigid at will, all constructed and arranged substantially for the purposes shown and described.

WILLIAM N. WHITELEY.

Witnesses:
F. B. FURNISS,
SOL J. HOUCK.